(12) United States Patent
Abrahams et al.

(10) Patent No.: US 10,073,842 B2
(45) Date of Patent: Sep. 11, 2018

(54) CULTURALLY-AWARE COGNITIVE SYSTEM FOR HUMAN INTERACTIONS

(71) Applicant: International Business Machines Corporation, Armonk, NY (US)

(72) Inventors: Faried Abrahams, Laytonsville, MD (US); Amol A. Dhondse, Pune (IN); Raman Harishankar, Blacklick, OH (US); Anand Pikle, Pune (IN); Gandhi Sivakumar, Victoria (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/182,873

(22) Filed: Jun. 15, 2016

(65) Prior Publication Data

US 2017/0364508 A1    Dec. 21, 2017

(51) Int. Cl.
| | |
|---|---|
| *G06F 17/21* | (2006.01) |
| *G10L 13/02* | (2013.01) |
| *G06F 17/28* | (2006.01) |
| *G10L 15/22* | (2006.01) |
| *G06F 17/27* | (2006.01) |
| *G06F 17/30* | (2006.01) |

(52) U.S. Cl.
CPC .......... *G06F 17/289* (2013.01); *G06F 17/274* (2013.01); *G06F 17/2785* (2013.01); *G06F 17/30401* (2013.01); *G06F 17/30867* (2013.01); *G10L 15/22* (2013.01); *G06F 17/21* (2013.01); *G10L 13/02* (2013.01)

(58) Field of Classification Search
CPC ..... G06F 17/2785; G06F 17/21; G10L 15/22; G10L 13/02
See application file for complete search history.

(56) References Cited

U.S. PATENT DOCUMENTS

| | | | | |
|---|---|---|---|---|
| 6,144,938 | A | * 11/2000 | Surace | G10L 13/033 704/257 |
| 8,447,607 | B2 | * 5/2013 | Weider | G06F 17/30864 704/250 |

(Continued)

OTHER PUBLICATIONS

Fasihuddin, H. et al.; Towards an adaptive model to personalize open learning environments using learning styles, 2014.

(Continued)

*Primary Examiner* — Samuel G Neway
(74) *Attorney, Agent, or Firm* — Garg Law Firm, PLLC; Rakesh Garg; Christopher K. McLane (57) ABSTRACT

A mapping is constructed between a node of a cultural hierarchy and a node of an organizational hierarchy. The cultural hierarchy is a data structure representing an arrangement of characteristics of different social levels relative to one another in a culture. The organizational hierarchy is a data structure representing an arrangement of characteristics of different roles of people relative to one another in a group. A set of cultural attributes is constructed to represent a persona of a human user according to mapping. Using a cultural attribute, an adjustment rule is selected from a library. A machine output is modified according to the adjustment rule. The machine output is in response to a dialog between a data processing system and human user in a machine-human interaction. The adjusted output is transformed and presented as a response to the human user in the machine-human interaction.

19 Claims, 5 Drawing Sheets

(56) References Cited

U.S. PATENT DOCUMENTS

| | | | | |
|---|---|---|---|---|
| 9,684,652 | B2* | 6/2017 | Connor | G06F 17/2881 |
| 9,690,784 | B1* | 6/2017 | Hughes | G06F 17/30 |
| 2003/0163309 | A1* | 8/2003 | Yamada | G10L 15/22 |
| | | | | 704/231 |
| 2004/0006471 | A1* | 1/2004 | Chiu | H04M 3/4938 |
| | | | | 704/260 |
| 2008/0208596 | A1* | 8/2008 | Heinze | G06F 17/28 |
| | | | | 704/277 |
| 2010/0049520 | A1* | 2/2010 | Stewart | G10L 15/22 |
| | | | | 704/257 |
| 2011/0131036 | A1* | 6/2011 | DiCristo | G06F 17/273 |
| | | | | 704/9 |
| 2011/0313767 | A1* | 12/2011 | Duffield | G10L 15/187 |
| | | | | 704/251 |
| 2012/0330869 | A1 | 12/2012 | Durham | |
| 2016/0236690 | A1* | 8/2016 | Juneja | G06F 3/16 |

OTHER PUBLICATIONS

Anonymous; Method and Apparatus for Trust, Vicinity, Natural Language Processing Based Collaboration Leveraging Insights-Based Cognitive Models, Apr. 21, 2015.

Anonymous; Cognitive help for software applications and system, Dec. 9, 2015.

Zhang et al; Cultural Standards, Dec. 11, 2010.

Roth et al; The Cultural Content of Cognition and the Cognitive Content of Culture: implications for Consumer Research, Advances in Consumer Research, vol. 15, 1988.

IBM; Dialog Tool, http://www.ibm.com/watson/developercloud/doc/dialog/, 2016.

Goodwin, The Cultural Part of Cognition, University of California, San Diego, Cogmitive Science 5, 179-195, 1981.

Roth et al; The Cultural Content of Cognition and the Cognitive Content of Culture: implications for Consumer Research, Advances in Consumer Research, vol. 15, pp. 403-410, 1988.

Bender et al; Anthropology in Cognitive Science, Top Cogn Sci. Jul. 2010;2(3):374-85. doi: 10.1111/i.1756-8765.2010.01082.x. Epub Mar. 8, 2010. http://www.ncbi.nlm.nih.gov/pubmed/25163866.

Westacott, Cognitive Relativism, Internet Encyclopedia of Philosophy, 2008. http://www.iep.utm.edu/cog-rel/.

Andre, EmoVoice -Genesys (Nuance / Utopy), 2005. https://www.informatik.uni-augsburg.de/lehrstuehle/hcm/projects/tools/emovoice/.

* cited by examiner

CULTURALLY-AWARE COGNITIVE SYSTEM FOR HUMAN INTERACTIONS

TECHNICAL FIELD

The present invention relates generally to a method, system, and computer program product for interactivity between machines and humans. More particularly, the present invention relates to a method, system, and computer program product for culturally-aware cognitive system for human interactions.

BACKGROUND

Hereinafter, a culture is a specification of societal norms that attributes a social position or status to a human who participates in a society formed according to specification. Often the specification takes the form of a hierarchy of social positions. A culture can be specific to a country or a region therein. Some cultures span multiple countries and apply to large regions of the world. Conversely, some cultures are micro-cultures in that they apply to small communities, such as tribes, organizations, or other groups of people.

A specification of a culture is sometimes expressed in text, but can also be oral or implied understanding of the societal norms that apply in the culture. Societal norms are human behavior, conduct, or mannerisms that are regarded as various degrees of desirable, acceptable, undesirable, or unacceptable within the culture.

Culturally-sensitive interaction is a complex undertaking. Different cultures regard different manners of interactions as desirable, or at least acceptable. Often, a manner of interaction that is acceptable in one culture may be unacceptable in another culture. For example, it is acceptable in certain western cultures to address a person by the person's first name. Certain eastern cultures regard addressing a person by the person's first name unacceptable, or even highly inappropriate if the person is an elder or occupies a certain position in that culture.

Furthermore, even within a given culture, interacting with different people can require different mannerisms. For example, a casual tone of a conversation is regarded as acceptable in informal business-related or non-business-related conversations with one's coworkers in one culture, whereas in another culture an informal tone is never acceptable with one's superior but is acceptable in non-business conversations with one's peer.

SUMMARY

The illustrative embodiments provide a method, system, and computer program product. An embodiment includes a method that constructs a mapping, using a processor and a memory, of a node of a cultural hierarchy to a node of an organizational hierarchy, wherein the cultural hierarchy is a data structure representing an arrangement of characteristics of different social levels relative to one another in a culture, and wherein the organizational hierarchy is a data structure representing an arrangement of characteristics of different roles of people relative to one another in a group. The embodiment constructs, using the processor and the memory, a set of cultural attributes, the set of cultural attributes representing a persona of a human user according to mapping. The embodiment selects from a library, using an attribute from the set of cultural attributes, an adjustment rule. The embodiment modifies a machine output according to the adjustment rule to create an adjusted output, wherein the machine output is in response to a dialog between a data processing system and human user in a machine-human interaction. The embodiment transforms the adjusted output to form a transformed output. The embodiment presents the transformation as a response to the human user in the machine-human interaction.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Presently, machines interact with humans under a variety of circumstances. The illustrative embodiments recognize that many machine-to-human interactions are more machine-like rather than more human-like, when it comes to cultural sensitivities.

A machine-like interaction is a machine output, which is logically correct according to the machine's programming, and which is structured correctly according to a grammar of a language of the output. A human-like interaction is still a machine output but is a rendering of the machine output that is responsive to a human recipient's social sensibilities in a way that another human would be responsive to the human recipient's social sensibilities. As an example, a machine-like interaction may say or show an output "what would you like to do John" to John Smith, Sr. the family elder as well as to John Smith, III, the third-grader, whereas a human-like interaction might be more social status-appropriate "what would you prefer to do sir" to John smith Sr. and "hey, what do you want to do" to little Johnny.

The illustrative embodiments recognize that grammatical and logical correctness of a machine's response in a machine-human interaction is insufficient for a human-like experience in the interaction. Many cultural aspects influence how the machine output should be modified so that the modified output is culturally acceptable in a culture and responsive to a human recipient's social sensibilities in that culture.

For example, even if the machine output is just limited to grammatical correctness, more than one grammatically correct choices are possible in a language, but some of the choices are not culturally acceptable under certain circumstances. For example, some cultures employ different grammatical constructs for conversations in different interactions according to a time of the interaction, place of the interaction, subject of the interaction, and/or the target person of the interaction. Furthermore, the grammatical constructs for similar circumstances of interactions can vary greatly from culture to culture.

The illustrative embodiments recognize that many other factors are at play in a culturally-correct interaction with humans. For example, different cultures, different people within a culture, and different circumstances, all influence the choices that may be available for a culturally-correct interaction with humans in those cultures. In order for a machine output to form a culturally-correct interaction with a human recipient in a given culture, some non-limiting example modifications to a machine output may include changing or adjusting a sentiment of the output, a pitch or tone of the voice used, sometimes even a gender of the voice or visual used, an accent or dialect used, speed at which the output is delivered, a manner of articulation used, repetitiveness or conciseness of the output, colloquialism or formalism used in the output, action accompaniment (e.g., bowing, waving, or folding hands), and other mannerisms involved in a dialog with a human.

The illustrative embodiments used to describe the invention generally address and solve the above-described problems and other problems related to making a machine-human interaction more human-like and culturally-appropriate.

An embodiment can be implemented as a software application. The application implementing an embodiment can be configured as a modification of an existing cognitive system or human interaction system, as a separate application that operates in conjunction with an existing cognitive system or human interaction system, a standalone application, or some combination thereof.

The selection of the culturally-appropriate adjustment to apply to a machine output is dependent in part upon the hierarchical specification of the given culture, to wit, a cultural hierarchy specification, as described earlier.

The human recipient with whom a culturally-appropriate interaction, or dialog, is desired, also occupies a position in an organizational hierarchy. The organization may be a business, where the organizational hierarchy is a hierarchy of business roles occupied by employees. The organization may be a family, where the organizational hierarchy is a hierarchy of roles of persons in the family. The organization may be vocational, where the organizational hierarchy is a hierarchy of expertise held by persons of that vocation. Many other types of organizations can similarly utilize organizational hierarchies and the same are contemplated within the scope of the illustrative embodiments.

Thus, the selection of the culturally-appropriate adjustment to apply to a machine output is also dependent in part upon the hierarchical specification of the given organization, to wit, an organizational hierarchy specification, as described herein. A final selection of the culturally-appropriate adjustment therefore depends on a combination of the two hierarchies, to wit, the cultural hierarchy and the organizational hierarchy. For example, a person—who occupies a social position that is lower than a threshold position on a cultural hierarchy of a given culture—may be high on an organizational hierarchy. In the given culture, the culturally-appropriate adjustment under the circumstance may be an adjustment that would be applied for a person who is higher than the person's actual social position on a cultural hierarchy. In another culture, a person—who occupies a social position that is lower than a threshold position on a cultural hierarchy of a given culture—may be high on an organizational hierarchy. In the other culture, the culturally-appropriate adjustment under the circumstance may be an adjustment that would be applied for the person's actual social position on a cultural hierarchy.

Thus, for each culture being considered, an embodiment creates a mapping between a cultural hierarchy of the culture and an organizational hierarchy of an organization in the culture. Given a human user's position in the organizational hierarchy, the embodiment models the user into a corresponding culturally-aware persona according to the mapping.

In one embodiment, the mapping of culture specification and organization hierarchy is a function of the social status of an individual with respect to other individuals present, e.g., in an audience. For example, the mapping of a celebrity in the presence of a public audience may be different than the mapping of the same celebrity person in a private interaction with the cognitive system of an embodiment.

A cultural library is applicable to a culture. A cultural library is a collection of culturally-appropriate adjustments that are applicable to a machine output in a machine-human interaction in a culture. An adjustment in a cultural library can take the form of a mapping, transformation logic, or rule, which takes all or a portion of a machine generated output as an input, and produces a culturally-appropriate output corresponding to that input. More than one adjustments can be applied to a machine output to produce a culturally-appropriate adjusted output.

The embodiment uses a cognitive model to select and apply an adjustment to a machine output, to engage the user in a human-like dialog in the machine-human interaction using the adjusted output, or both. The embodiment presents the adjusted output to the user in any suitable form during the dialog. For example, a machine output in textual form can be adjusted for cultural appropriateness according to the user's cultural persona, and transformed into speech using text-to-speech conversion. Similarly, the machine output can be adjusted for cultural appropriateness according to the user's cultural persona, and transformed into a suitable behavior in animated avatars, video, textual representation in a suitable language or format, instead of, or in addition to, using text-to-speech conversion.

In one embodiment, the machine output may also be mapped to an action or behavior selected from an actions/behavior library, instead of or in addition to voice, text, video and other transformations. For example, a bowing action may be added when the interaction is with a high ranking officer in certain Eastern culture, or a gesturing action may be added when interacting with a toddler, and so on. As a non-limiting example, the action or behavior adjustments can be accomplished by suitably adapting the machine output to the mechanical or motor functions of a robotic apparatus.

Furthermore, an embodiment can be configured to further tune or refine the applied adjustments in mixed or confusing environments. For example, when interacting with a group, the possibility exists that more than one societal levels or one or more cultures may be present in the group. Accordingly, an embodiment may be configured to select only a safe set of persona attributes and ignore other persona attributes. For example, an output of the cognitive action of an embodiment may be mapped based on individuals or groups (federated groups) wherein some common attributes of some plurality of personas are blended based on pre-defined rules, precedence, or priority, and the non-blended attributes are disregarded. As another non-limiting example, in an audience of mixed or unknown cultures, an embodiment may be configured to render only the high-priority cultural attributes that relate to senior citizens and children, and skip all the other attributes.

A method of an embodiment described herein, when implemented to execute on a device or data processing system, comprises substantial advancement of the functionality of that device or data processing system in presenting machine output as a human-like culturally-appropriate dialog in a machine-human interaction. For example, presently available methods for machine-human interaction relies primarily on grammatical and logical correctness of a machine output but is insensitive to the human recipient's cultural sensibilities. An embodiment provides a method for adjusting a machine output according to a cultural hierarchy and an organizational hierarchy that its applicable to the human recipient. The adjustment is selected from a cultural library according to the appropriateness with the cultural persona of the human. This manner of culturally-aware cognitive system for human interactions is unavailable in the presently available methods. Thus, a substantial advancement of such devices or data processing systems by executing a method of an embodiment is in making machine-human interactions culturally-appropriate according to a culture in which the human dialogs with a machine.

The illustrative embodiments are described with respect to certain types of interactions, cultures, social norms, hierarchies, positions, machine outputs, adjustments, transformations, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
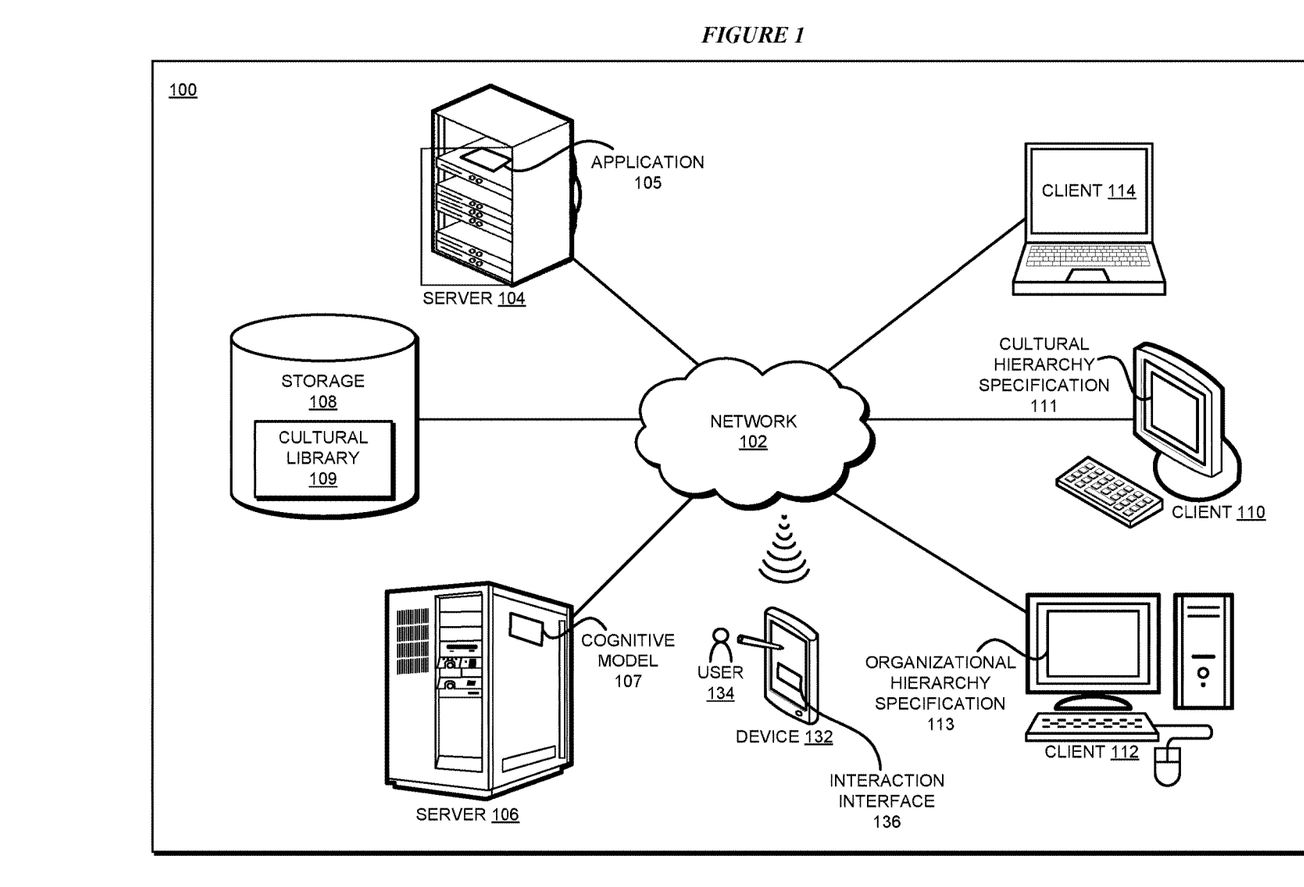
FIG. 1 depicts a block diagram of a network of data processing systems in which illustrative embodiments may be implemented.
Figure 2:
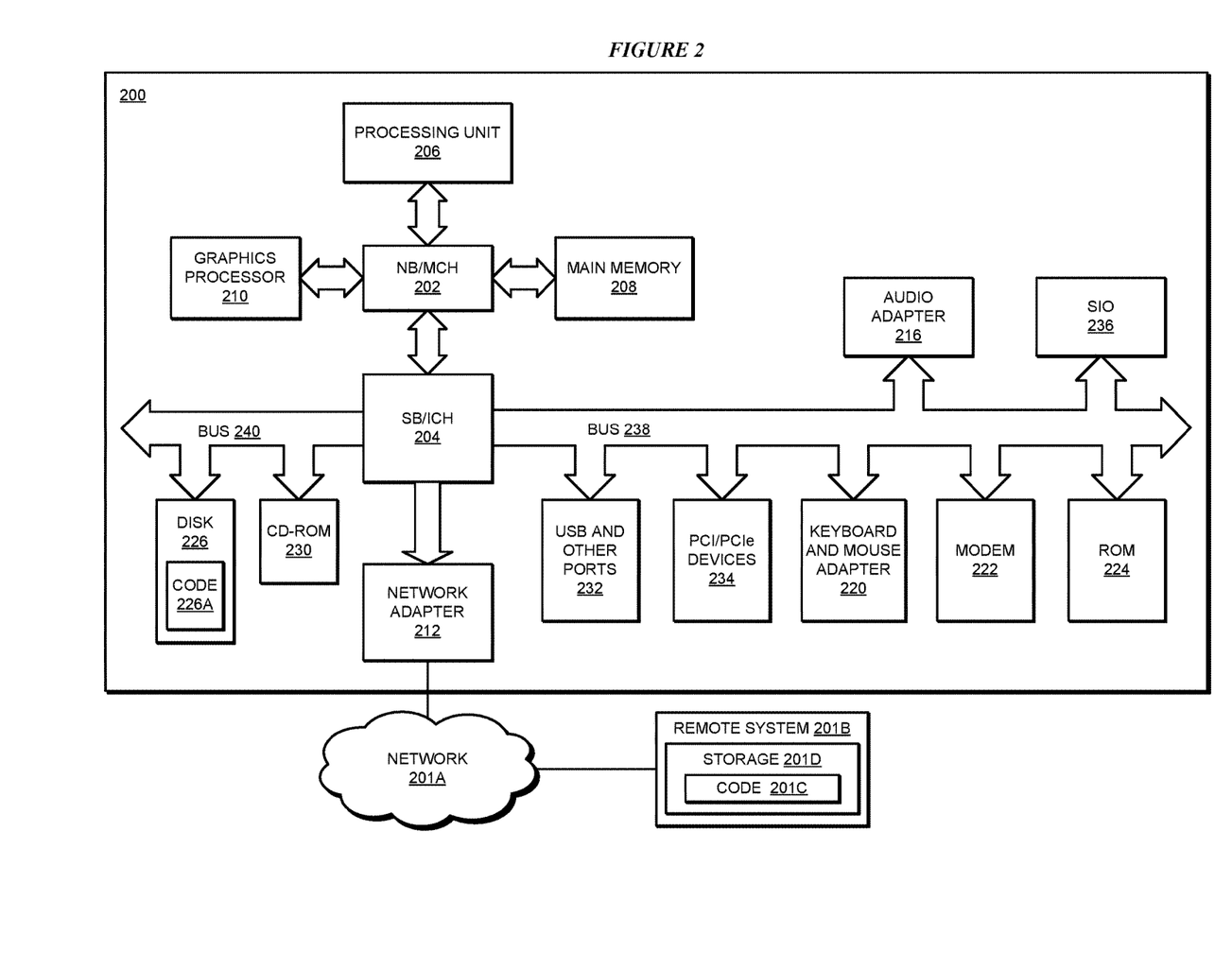
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be Implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. User 134 uses interaction interface 136 on device 132 to have a dialog with a machine or system in data processing environment. Application 105 uses cognitive model 107, cultural library 109, cultural hierarchy specification 111, and organizational hierarchy specification 113, to hold such a dialog with user 134, in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
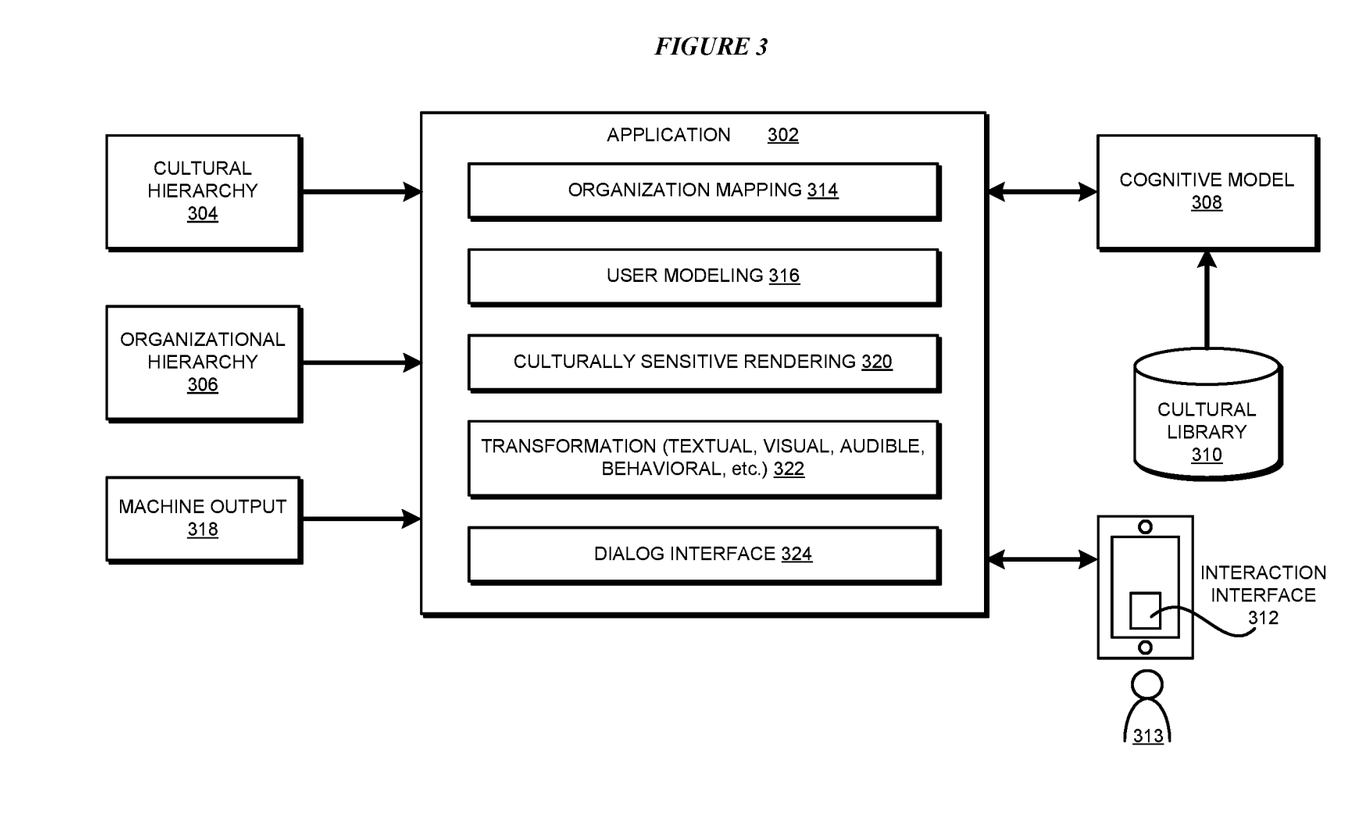
FIG. 3 depicts a block diagram of an example configuration for culturally-aware cognitive system for human interactions in accordance with an illustrative embodiment.

With reference to FIG. 3, this figure depicts a block diagram of an example configuration for culturally-aware cognitive system for human interactions in accordance with an illustrative embodiment. Application 302 is an example of application 105 in FIG. 1. Cultural hierarchy 304 is an example of cultural hierarchy specification 111 in FIG. 1. Organizational hierarchy 306 is an example of organizational hierarchy specification 113 in FIG. 1. Cognitive model 308 is an example of cognitive model 107 in FIG. 1. Cultural library 310 is an example of cultural library 109 in FIG. 1. Interaction interface 312 is an example of interaction interface 136. User 313 is an example of user 134 in FIG. 1.

Component 314 forms a mapping between levels or nodes in organizational hierarchy 306 and levels or nodes in cultural hierarchy 304. Component 316 models user 313, e.g., by using a profile (not shown) of user 313 that may be available to application 302, according to the mapping produced by component 314. A persona produced by component 316 includes a set of cultural attributes that describe a mapped organizational hierarchy level, mapped cultural hierarchy level, or both, that apply to the persona.

Machine output 318 is an output produced from a machine or system configured to engage a human, e.g., user 313, in a machine-human interaction. Component 320 configures cognitive model 308 such that cognitive model 308 can accept as inputs machine output 318 and a culturally modeled persona of a user produced by component 316. Using the cultural attributes of the persona, cognitive model 308 selects one or more adjustments that should be applied to machine output 318. Cognitive model 308 returns an adjusted output to component 320. The adjusted output is a culturally sensitive rendering of machine output 318 as applies to a culturally-appropriate persona of user 313.

Component 322 applies a suitable transformation to the adjusted output. For example, component 322 produces audio, visual, or animation version of the adjusted output with the behavioral characteristics suitable according to one or more cultural attributes of the persona. Dialog interface 324 communicates with interface 312 to deliver the adjusted output or a transformation thereof to user 313.

Figure 4:
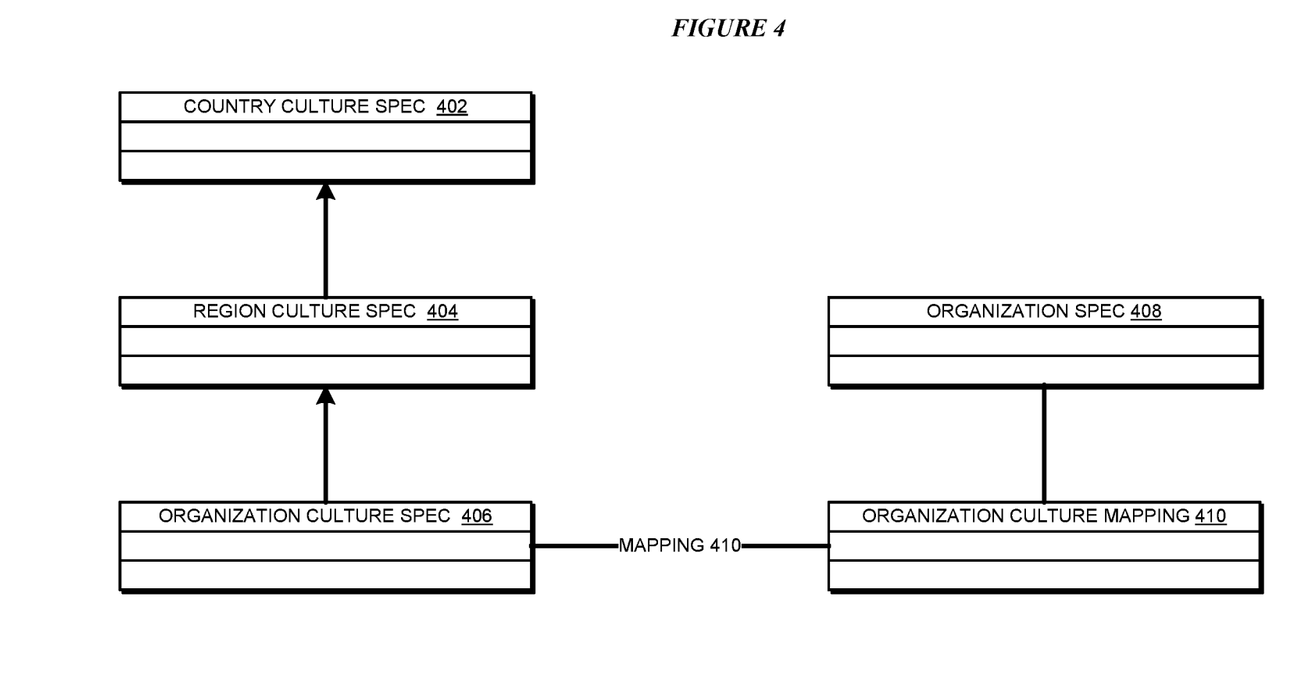
FIG. 4 depicts a simplified mapping between a cultural hierarchy and an organizational hierarchy in accordance with an illustrative embodiment.

With reference to FIG. 4, this figure depicts a simplified mapping between a cultural hierarchy and an organizational hierarchy in accordance with an illustrative embodiment. Any of specifications 402, 404, and 406 can be an example of cultural hierarchy 304 in FIG. 3. Each of specifications 402, 404, and 406 comprises structured data representative of the hierarchy in that specification.

As described herein, cultures can be specific to countries, regions, or smaller groups. Assume as a non-limiting example, that the largest geographical area influenced by a culture is a country. Accordingly, country culture specification 402 is an example cultural hierarchy that applies to the country as a whole.

A regional culture inherits all or parts of a larger culture and refines the culture within the region for regional applicability. Accordingly, region culture specification 404 is an example cultural hierarchy that inherits from country culture specification 402, and applies to a region within the country of country culture specification 402.

A small group, as described earlier, can be an organization of some type and have a culture of its own. Accordingly, organization culture specification 406 is an example cultural hierarchy that inherits from region culture specification 404, and applies to an organization within the region of region culture specification 404. Note that organization culture specification 406 may inherit from more than one (not shown) region culture specifications 404.

The organization also has an organizational hierarchy, which is represented by organization specification 408. Organization specification 408 comprises structured data representative of the hierarchy in specification 408.

Mapping operation 410, such as the operation of component 314 in FIG. 3, maps a cultural specification to an organization specification. As depicted in this figure, mapping operation 410 maps organization culture specification 406 to organization specification 408 to produce organization culture mapping 412. Organization culture mapping 412 can be used to produce a persona of user 313 in FIG. 3 and the associated set of culture attributes.

Figure 5:
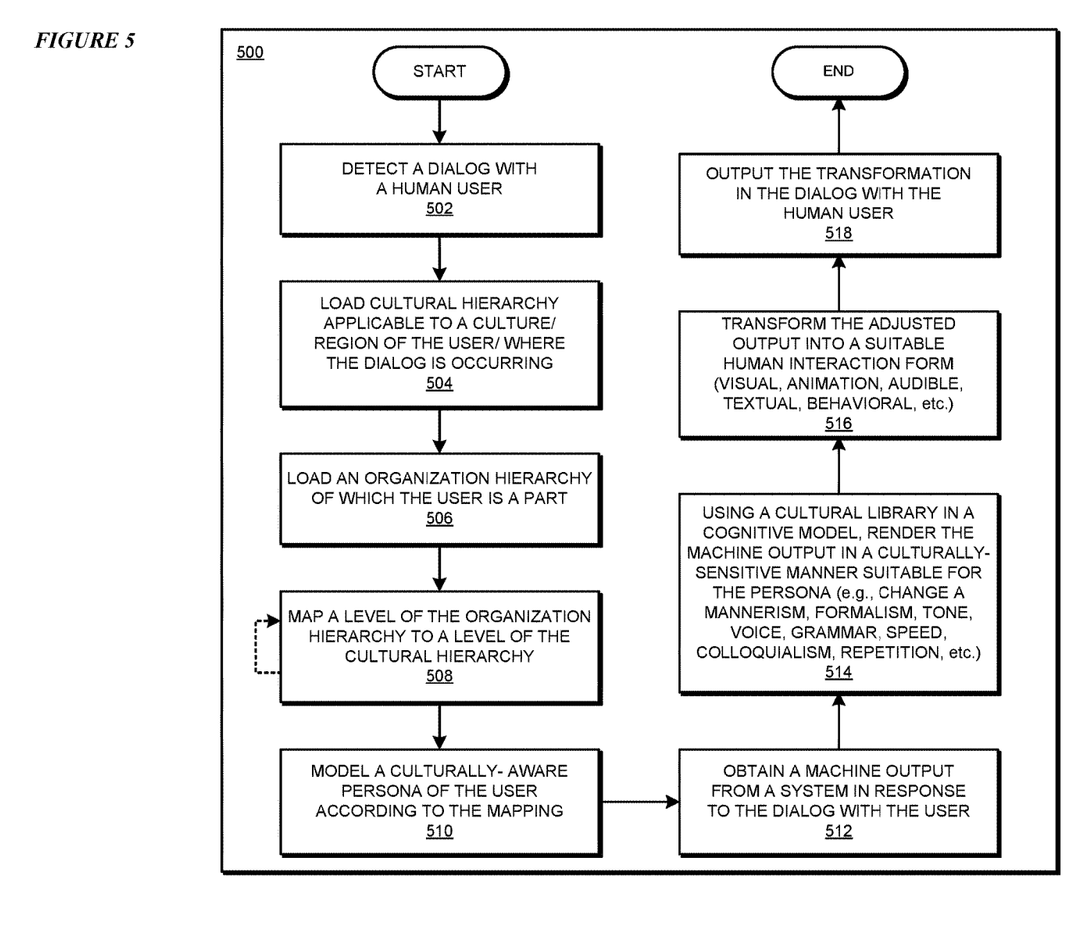
FIG. 5 depicts a flowchart of an example process for culturally-aware cognitive system for human interactions in accordance with an illustrative embodiment.

With reference to FIG. 5, this figure depicts a flowchart of an example process for culturally-aware cognitive system for human interactions in accordance with an illustrative embodiment. Process 500 can be implemented in application 302 in FIG. 3.

The application detects a dialog with a human user (block 502). The application loads a cultural hierarchy applicable to the culture, e.g., a region or a group to which the user belongs or a region where the dialog is occurring (block 504). The application loads an organizational hierarchy of the group of which the user is a part (block 506).

The application maps a level of the organizational hierarchy to a level of the cultural hierarchy (block 508). The application repeats block 508 as necessary depending on the number of mappings that may have to be performed. A level from an organizational hierarchy can map to multiple levels of a cultural hierarchy, and vice versa.

The application models a culturally-aware persona of the user according to the mapping (block 510). The application obtains a machine output from a system in response to the dialog with the user (block 512).

Using a cultural library in a cognitive model, the application renders the machine output in a culturally-sensitive manner suitable for the persona (block 514). For example, the application changes a mannerism, formalism, tone, voice, grammar, speed, colloquialism, repetition, conciseness and other culturally-variable aspects of the machine output to form an adjusted output.

The application transforms the adjusted output into a suitable form of human interaction, e.g., visual, animation, audible, textual, or behavioral form (block 516). The application outputs the transformation in the dialog with the human user (block 518). The application ends process 500 thereafter.

Thus, a computer implemented method, system or apparatus, and computer program product are provided in the illustrative embodiments for culturally-aware cognitive system for human interactions and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
constructing a mapping, using a processor and a memory, of a node of a cultural hierarchy to a node of an organizational hierarchy, wherein the cultural hierarchy is a data structure representing an arrangement of characteristics of different social levels relative to one another in a culture, and wherein the organizational hierarchy is a data structure representing an arrangement of characteristics of different roles of people relative to one another in a group;
producing a machine output data from a data processing system, the machine output being in response to a dialog between a data processing system and a human user in a machine-human interaction;
creating, using the processor and the memory, a new data-representation of a persona of the human user in the form of a set of cultural attributes, the set of cultural attributes representing the persona of the human user according to the mapping;
selecting from a library, using an attribute from the set of cultural attributes, an adjustment rule;
creating a new data output by changing a grammatical choice in the machine output data, the creating the new data output comprising:
applying the adjustment rule to the machine output data in a cognitive model of a cognitive system, the new data output forming an adjusted output, wherein the changing the grammatical choice increases a correspondence between the machine output data and a persona of the human user;
transforming the adjusted output to form a transformed output, the transforming comprising assigning a behavior characteristic to an animation and constructing the animation from the adjusted output such that an animated avatar is caused to exhibit a distinct behaviour characteristic specific to a culture of the human user; and
causing the data processing system to perform a culturally-appropriate manner of articulation using the transformed output as a response to the human user in the machine-human interaction, wherein the culturally-appropriate manner of articulation is consistent with the culture of the human user.

2. The method of claim 1, further comprising:
assigning, as a part of the transforming, a behavior characteristic to a video representation, wherein the transforming constructs the video representation from the adjusted output.

3. The method of claim 1, further comprising:
assigning, as a part of the transforming, a behavior characteristic to a speech representation, wherein the transforming constructs the speech representation from the adjusted output.

4. The method of claim 1, wherein the creating the new data output changes an informally stated phrase having a meaning in the machine output to a formal statement of the meaning in the adjusted output.

5. The method of claim 1, wherein the creating the new data output changes a formally stated phrase having a meaning in the machine output to an informal statement of the meaning in the adjusted output.

6. The method of claim 1, wherein the creating the new data output changes a first grammatical structure of a phrase having a meaning in the machine output to a second grammatical structure of the phrase the meaning in the adjusted output, wherein the first grammatical structure and the second grammatical structure are both correct in a given language.

7. The method of claim 1, wherein the creating the new data output changes a first sentiment of a phrase having a meaning in the machine output to a second sentiment of the phrase having the meaning in the adjusted output.

8. The method of claim 1, wherein the creating the new data output changes a first tone of a phrase in the machine output to a second tone of the phrase in the adjusted output.

9. The method of claim 1, wherein the creating the new data output changes a repetition of a phrase in the machine output to a concise phrase in the adjusted output.

10. The method of claim 1, wherein the creating the new data output changes a first voice of a phrase in the machine output to a second voice of the phrase in the adjusted output.

11. The method of claim 1, further comprising:
selecting from an action library, an action corresponding to the machine output; and
causing, as a part of the articulating, an apparatus to perform the action in the adjusted output.

12. The method of claim 1, further comprising:
deriving the data structure of the cultural hierarchy by inheriting from a data structure of a country cultural hierarchy, wherein the data structure of the country cultural hierarchy is constructed according to a culture of a country.

13. The method of claim 1, further comprising:
deriving the data structure of the cultural hierarchy by inheriting from a data structure of a region cultural hierarchy, wherein the data structure of the region cultural hierarchy is constructed according to a culture of a region in a country;
deriving the data structure of the region cultural hierarchy by inheriting from a data structure of a country cultural hierarchy, wherein the data structure of the country cultural hierarchy is constructed according to a culture of the country.

14. The method of claim 1, wherein the organization is a business enterprise, and wherein the data structure of the organizational hierarchy comprises a hierarchy of business roles in the business enterprise.

15. The method of claim 1, further comprising:
selecting from a set of cultural hierarchies, responsive to detecting an occurrence of the dialog in the machine-human interaction with the human user, the data structure of the cultural hierarchy, wherein the data structure of the cultural hierarchy corresponds to a culture identified in a profile of the human user.

16. The method of claim 1, further comprising:
selecting from a set of organizational hierarchies, responsive to detecting an occurrence of the dialog in the machine-human interaction with the human user, the data structure of the organizational hierarchy, wherein the group is an organization, and wherein the data structure of the organizational hierarchy corresponds to a role in the organization identified in a profile of the human user.

17. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

18. A computer usable program product comprising one or more computer-readable storage devices, and program instructions stored on at least one of the one or more storage devices, the stored program instructions comprising:
program instructions to construct a mapping, using a processor and a memory, of a node of a cultural hierarchy to a node of an organizational hierarchy, wherein the cultural hierarchy is a data structure representing an arrangement of characteristics of different social levels relative to one another in a culture, and wherein the organizational hierarchy is a data structure representing an arrangement of characteristics of different roles of people relative to one another in a group;
program instructions to produce a machine output data from a data processing system, the machine output being in response to a dialog between a data processing system and a human user in a machine-human interaction;
program instructions to create, using the processor and the memory, a new data-representation of a persona of the human user in the form of a set of cultural attributes, the set of cultural attributes representing the persona of the human user according to the mapping;
program instructions to select from a library, using an attribute from the set of cultural attributes, an adjustment rule;
program instructions to create a new data output by changing a grammatical choice in the machine output data, the program instructions to create the new data output comprising:
program instructions to apply the adjustment rule to the machine output data in a cognitive model of a cognitive system, the new data output forming an adjusted output, wherein the changing the grammatical choice increases a correspondence between the machine output data and a persona of the human user;
program instructions to transform the adjusted output to form a transformed output, the transforming comprising assigning a behavior characteristic to an animation and constructing the animation from the adjusted output such that an animated avatar is caused to exhibit a distinct behaviour characteristic specific to a culture of the human user; and
program instructions to cause the data processing system to perform a culturally-appropriate manner of articulation using the transformed output as a response to the human user in the machine-human interaction, wherein the culturally-appropriate manner of articulation is consistent with the culture of the human user.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to construct a mapping, using a processor and a memory, of a node of a cultural hierarchy to a node of an organizational hierarchy, wherein the cultural hierarchy is a data structure representing an arrangement of characteristics of different social levels relative to one another in a culture, and wherein the organizational hierarchy is a data structure representing an arrangement of characteristics of different roles of people relative to one another in a group;
program instructions to produce a machine output data from a data processing system, the machine output being in response to a dialog between a data processing system and a human user in a machine-human interaction;
program instructions to create, using the processor and the memory, a new data-representation of a persona of the human user in the form of a set of cultural attributes, the set of cultural attributes representing the persona of the human user according to the mapping;

program instructions to select from a library, using an attribute from the set of cultural attributes, an adjustment rule;

program instructions to create a new data output by changing a grammatical choice in the machine output data, the program instructions to create the new data output comprising:

program instructions to apply the adjustment rule to the machine output data in a cognitive model of a cognitive system, the new data output forming an adjusted output, wherein the changing the grammatical choice increases a correspondence between the machine output data and a persona of the human user;

program instructions to transform the adjusted output to form a transformed output, the transforming comprising assigning a behavior characteristic to an animation and constructing the animation from the adjusted output such that an animated avatar is caused to exhibit a distinct behaviour characteristic specific to a culture of the human user; and program instructions to cause the data processing system to perform a culturally-appropriate manner of articulation using the transformed output as a response to the human user in the machine-human interaction, wherein the culturally-appropriate manner of articulation is consistent with the culture of the human user.

\* \* \* \* \*